United States Patent [19]  [11] 3,756,344
Daiber et al.  [45] Sept. 4, 1973

[54] LASER-DRIVEN SHOCK TUBE

[75] Inventors: John W. Daiber; Ronald G. Rehm, both of Williamsville; Herbert M. Thompson, Depew, all of N.Y.

[73] Assignee: Cornell Aeronautical Laboratory, Inc., Buffalo, N.Y.

[22] Filed: Dec. 22, 1971

[21] Appl. No.: 210,659

[52] U.S. Cl............................ 181/.5 NP, 176/1, 73/12, 73/35, 73/147, 181/.5 R
[51] Int. Cl. ............................................. G01k 11/22
[58] Field of Search ...................... 176/1; 73/12, 24, 73/35, 147; 181/.5 NP, .5 R

[56] References Cited
UNITED STATES PATENTS
3,410,142  11/1968  Daiber et al. ...................... 73/15 R
3,489,645  1/1970  Daiber et al. .......................... 176/1

OTHER PUBLICATIONS

Daiber et al., "Laser Driven Waves in a Fuel Expanding Gas Jet," 1/71, Pg. 310–314, J. Appl. Phys. Vol. 42, No. 1.

*Primary Examiner*—Benjamin A. Borchelt
*Assistant Examiner*—N. Moskowitz
*Attorney*—Allen J. Jaffe

[57]  ABSTRACT

A laser driven shock tube wherein a laser is focused in the vicinity of a supersonic free expansion jet orifice at one end of a shock tube whereby a hot plasma is generated which drives a shock wave through the orifice and into the tube.

6 Claims, 2 Drawing Figures

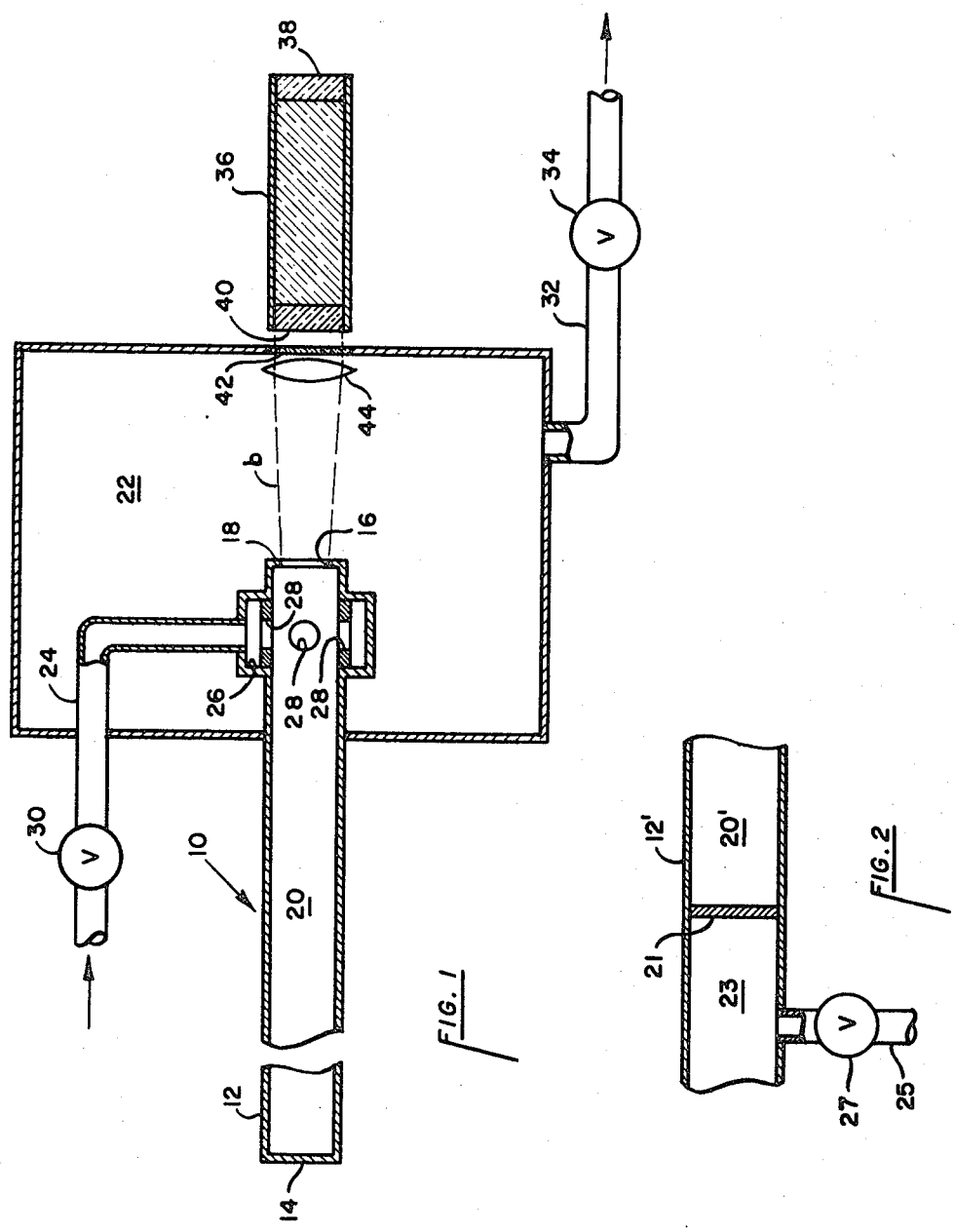

LASER-DRIVEN SHOCK TUBE

BACKGROUND OF THE INVENTION

The present invention relates to shock tubes and, more particularly, laser-driven shock tubes.

Laser-driven shock tubes are known (see U.S. Pat. No. 3,410,142) wherein a plurality of lasers are placed in surrounding relation to a driver gas compression chamber, the walls of which are fabricated of a material that is transparent to the laser illumination. Each of the lasers are focused by a plurality of external lenses at the longitudinal axis of the chamber. Although the intensity of the laser radiation is greater at the central volume of the chamber, it has been found that the intensity is sufficiently great at the chamber walls to cause certain undesirable effects. First, the walls absorb this relatively high intensity radiation and emit atoms which may contaminate the driver gas. This contamination alone is not a serious defect, since little mixing occurs between the driver and driven test gas; however, the intensity of absorption by the walls of the chamber can actually cause the failure t hereof which, of course, may result in a destruction of the test apparatus.

SUMMARY OF THE INVENTION

The foregoing disadvantages are overcome according to the present invention which provides a laser-driven shock tube wherein there is virtually no interaction between the walls of the driver chamber and the laser radiation. This is accomplished by causing the driver gas, which may also be the test gas, to undergo a supersonic free-jet expansion through one or more orifices at which one or more lasers are focused by lens means or the like located interiorly of a vacuum chamber downstream of the orifice. The laser irradiation of the density gradient created by this expansion results in a fast moving hot luminous plasma into a reservoir of the driven or test gas producing a shock wave ahead of such plasma in the reservoir.

Basically, then, the present invention provides; a high pressure chamber, a low pressure chamber, orifice means separating the chambers, coherent radiation producing means and means for focusing the radiation in the vicinity of the orifice means.

BRIEF DESCRIPTION OF THE DRAWINGS

For a fuller understanding of the present invention reference should now be had to the following detailed discussion of the same taken in conjunction with the accompanying drawings wherein:

FIG. 1 is a schematic representation of the laser-driven shock tube of the present invention with parts thereof sectionally illustrated; and FIG. 2 is a fragmentary sectional view of a modified form of the FIG. 1 embodiment.

DESCRIPTION OF THE PREFERRED EMBODIMENTS

Referring now to the drawings and, more particularly, to FIG. 1 the high pressure chamber, which may function as a conventional shock tube, is generally depicted at 10 and comprises a cylindrical tube 12 closed at one end 14 and having a restricted orifice or nozzle 16 at its other end 18.

The interior of tube 12 defines a high pressure test chamber 20 which communicates with a vacuum chamber 22 via orifice 16. A driver or test gas supply line 24 communicates with chamber 20 via an annular chamber 26 and a plurality of circumferentially spaced ports 28, the total area of which being greater than the throat area of orifice 18. The flow of gas in line 24 is suitably controlled from a source of high pressure by means of a valve 30 or the like.

Chamber 22 communicates with a suitable low pressure vacuum source through a line 32 which may be controlled by a valve 34 or the like. Exteriorly of chamber 22 and optically aligned with orifice 16 is a laser device 36 which may comprise a standard ruby laser having a reflective end 38 and a partially reflective end 40. A window 42 transparent to the laser illumination is located in the wall of chamber 22 and aligned with the optical axis of the laser. Suitably supported within chamber 22 by means not illustrated is a lens 44 for focusing the laser light in the vicinity of orifice 16. Since the lens 44 is located interiorly of chamber 22 the laser rays do not converge and build in intensity until they have passed through window 42; thus, the strength of the window is not critical.

In operation, with valve 30 closed and valve 34 opened chamber 22 is evacuated. Valve 34 is then closed and valve 30 is opened permitting high pressure driver or test gas to flow through line 24 into chamber 20 and across orifice 16. With the size of orifice 16 smaller than the driver gas inlet and the pressure differential thereacross below the critical ratio, the gas expansion through the orifice becomes choked and a supersonic flow occurs. The laser is actuated and energy is absorbed therefrom by the driver gas in the vicinity of the orifice 16. Due to the density gradient created by the expansion of the driver gas the penetration of the laser energy into the driver gas near orifice 16 is possible for the complete duration of the laser pulse. This results in a fast moving luminous plasma creating a shock wave which propagates into chamber or shock tube 20.

For any given shock tube the actual value of the shock wave Mach numbers depends upon the energy of the laser. For example with hydrogen driver gas at 15 psia and a vacuum chamber pressure of less than 1 torr, the pressure differential across the orifice is less than 0.0013. The chamber pressure of less than 1 torr is sufficiently low that no breakdown of the gas occurs as the laser beam travels from the entrance window to the free-jet. For this driver gas and peak ruby laser source of 420 MW power, a shock wave of Mach number 318 has been obtained. The laser was focused about 2.8 mm in front of the orifice.

In the description of the above embodiment the driver gas and the gas under test in the shock tube 20 has been considered to be the same; hence, no separation is required. Since the efficiency with which the laser irradiation is absorbed by a gas is a function of the electronic charge of the driver gas atoms or molecules, there are many situations where it would be desirable to utilize different driver and driven or test gases. In these situations a suitable frangible barrier would be provided such as 21 in FIG. 2, which would separate the tube 12' into a driver chamber 20' and a driven chamber 23, to which the test gas would enter via line 25 under the control of a valve 27. The shock wave produced by the luminous plasma will rupture the barrier 21 and drive the test gas to suitable pressures and temperatures as in the case of conventional shock tubes.

It is also possible to place a frangible diaphragm at the orifice 16 to separate the driver gas from the vacuum chamber until the proper vacuum level is established in the chamber. This would economize on the amount of driver gas being utilized.

Although a single orifice at the end of the tube has been illustrated and described, it is possible to utilize a plurality of orifices located at various portions on the wall of the hollow tube 12. Additionally, a plurality of lasers can be provided for each orifice.

Although preferred embodiments of the present invention have been disclosed and described, changes will obviously occur to those skilled in the art; thus the scope of the invention is to be measured only by the appended claims.

1. Apparatus of the character described, comprising;
   a. a high pressure chamber,
   b. a low pressure chamber,
   c. means providing restricted communication between said chambers,
   d. coherent radiation producing means,
   e. means for focusing the radiation from said producing means in the vicinity of said means providing restricted communication, and
   f. the pressure differential across said means providing restricted communication is such that a supersonic flow occurs therethrough.

2. The apparatus according to claim 1 wherein said high pressure chamber comprises a hollow tube having one or more walls, and said means providing restricted communication comprises free expansion jet orifice means in said one or more walls of said tube.

3. The apparatus according to claim 2 further comprising frangible means dividing said tube into a driver chamber and a driven chamber.

4. The apparatus according to claim 3 wherein said jet orifice means communicates with said driver chamber.

5. The apparatus according to claim 1 further comprising a frangible diaphragm in said means providing restricted communication between said chambers.

6. The apparatus according to claim 1 wherein said high pressure chamber comprises a shock tube, and said means providing restricted communication comprises a free expansion jet orifice at one end of said shock tube.

* * * * *